United States Patent [19]
Lang et al.

[11] Patent Number: 4,807,249
[45] Date of Patent: Feb. 21, 1989

[54] CIRCUIT ARRANGEMENT FOR SERIAL DATA TRANSMISSION BETWEEN A PLURALITY OF SUBSCRIBER STATIONS

[75] Inventors: Otto Lang; Manfred Dombrowski, both of Munich, Fed. Rep. of Germany

[73] Assignee: Siemens Aktiengesellschaft, Berlin and Munich, Fed. Rep. of Germany

[21] Appl. No.: 15,713

[22] Filed: Feb. 17, 1987

[30] Foreign Application Priority Data

Feb. 17, 1986 [DE] Fed. Rep. of Germany ....... 3604952

[51] Int. Cl.$^4$ ............................................. H04L 25/02
[52] U.S. Cl. .................................... 375/7; 375/36
[58] Field of Search ............................. 375/7, 17, 36;
178/63 R, 63 B, 63 C, 63 F; 370/85; 455/58;
340/825.5; 371/57

[56] References Cited

U.S. PATENT DOCUMENTS

| 4,380,080 | 4/1983 | Rattlingourd | 375/17 |
|---|---|---|---|
| 4,398,298 | 8/1983 | Egmond et al. | 375/7 |
| 4,479,228 | 10/1984 | Crane | 375/7 |
| 4,519,074 | 5/1985 | Basile | 455/58 |
| 4,649,548 | 3/1987 | Crane | 455/58 |

FOREIGN PATENT DOCUMENTS 2363240 3/1978 France .
5958939 9/1982 Japan .

OTHER PUBLICATIONS

"Data Transmission Is Faster With Ternary Coding," Bruins, Electronics vol. 47, No. 11, May 30, 1974 (pp. 119-120).
"IC-Reihe fur RS-485-und RS-422-Anwedungen," Elektronik, vol. 10, May 17, 1985, p. 131.
"RS422 and Beyond," Burgess, Electronic Engineering, Oct. 1981, pp. 81-85.
"Line Drivers Are Not Limited To Computer Systems," Pippenger, Electronic Design News, vol. 17, No. 6, Mar. 1972, pp. 44-46.
"Interface-Standard RS-485 Jetzt Praktisch Anwendbar," Elekotronik, vol. 6, Mar. 23, 1984, p. 24.
"Bus-fahige Schnittstelle Nach RS 485/422," Elektronik, vol. 12, Jun. 15, 1984, pp. 97-98.

Primary Examiner—Benedict V. Safourek

[57] ABSTRACT

A circuit arrangement is provided for serial data transmission between a plurality of subscriber stations via a data bus, the circuit arrangement comprising data transmitters that are in a high-impedance state in the passive condition and in a low-impedance state in the active condition. In such a circuit arrangement, a mutual control of the subscriber stations occurs by way of the data bus without the assistance of additional control lines. This is achieved with the assistance of a recognition circuit having two data receivers in fail-safe circuitry connected in an antiparallel manner at their inputs and having their outputs connected to a logic element. The control arrangement is particularly suited for utilization in remote control devices.

6 Claims, 2 Drawing Sheets

CIRCUIT ARRANGEMENT FOR SERIAL DATA TRANSMISSION BETWEEN A PLURALITY OF SUBSCRIBER STATIONS

CROSS REFERENCE TO RELATED APPLICATIONS

This application is related to application Ser. No. 015,710, filed Feb. 17, 1987 and application Ser. No. 014,536 filed Feb. 13, 1987.

BACKGROUND OF THE INVENTION

1. Field of the Invention

The present invention relates to a circuit arrangement for serial data transmission between a plurality of subscriber stations comprising at least two data transmitters which have their output terminals connected to the same data bus having two leads and respectively having a control input connected to a control arrangement and controllable by the control arrangement such that, at most, one of the data transmitters is activated at a given time. As a result, in the activated condition, a data transmitter outputs a voltage of a first polarity or a second polarity to the data bus dependent on the state of a data signal applied to the input and has a higher internal resistance at the output in the passive condition than in the active condition. At least one data receiver is connected to the data bus which, constructed as a differential amplifier, assumes one of two prescribed signal states at its output given an existing input voltage which is dependent on the polarity thereof.

2. Description of the Prior Art

A circuit arrangement of the type generally set forth above is already known from the publication "Elektronik", 6/23 March 1984, page 24 and 2/15 June 1984, pages 97 and 98.

The known circuit arrangement contains interface modules for serial transmission, each of which modules is composed of a data transmitter and a data receiver and is suitable for full-duplex or half-duplex operation. In half-duplex operation, the output of the data transmitter is directly connected to the input of the data receiver in each subscriber station. The subscriber stations which can be, for example, a computer and peripheral devices connected thereto, are connected to a data bus. The data transmitter and the data receiver in each subscriber station can be driven into an active condition or into a passive condition by control signals.

Since the transmitters, in an active condition, represent a low-impedance voltage source at the output whose voltage is dependent on the logic level of the data signal applied to the input, only one data transmitter can be active at a given time.

To this end, the control signal that drives the data transmitter of a subscriber station into its active condition can be transmitted to all other subscribers and can be used therein to make an activation impossible for the time in which the data bus is occupied. It is thereby obvious to transmit control signals via control lines or via a control bus that is provided in addition to the data bus.

SUMMARY OF THE INVENTION

An object of the present invention is to provide a circuit arrangement of the type set forth above which is particularly characterized such that a mutual control of the subscriber stations occurs via the data bus per se without the assistance of additional control lines, this mutual control being accomplished such that the subscriber station can access the data bus on their own when the bus is not occupied by another subscriber station.

Given a circuit arrangement of the type set forth above, all data transmitters are in a high-impedance state at the output given an unoccupied data bus.

A perception within the scope of the invention is that the high-impedance tristate condition can be exploited for control purposes in that the level conditions on the data bus are evaluated such that a free signal is formed given an unoccupied line and a control signal that is independent of the logic state of the data signal is acquired given an occupied or busy line.

Considerations within the scope of the invention have further shown that interface modules comprising what is referred to as a fail-safe circuit are particularly suited for contributing to the resolution of the above object of the invention. Given an interruption at the input side and, therefore, given a high-impedance source, in particular, interface modules of the aforementioned type must emit a defined output level in order to offer the desired reliability.

For example, the German periodical "Elektronik" May 10/17, 1985, page 131, discloses an IC series for RS485/RS422 applications that are intended for fail-safe purposes. The receiver modules comprise a high input impedance. A fail-safe circuit applies the output to a "high" level when the input is open.

The known modules are intended for applications in which a line interruption at the input side leads to a prescribed receiver output signal so that dangerous misdrives can be reliably avoided.

According to the invention a circuit arrangement for achieving the aforementioned object is constructed in such a manner that it is particularly characterized in that at least one of the control arrangements is preceded by a recognition circuit connected to the data bus, in that the recognition circuit contains two data receivers constantly ready to receive data and whose inputs are connected to the data bus in an antiparallel manner and whose outputs are connected to the inputs of the logic element, and in that the data receivers assume one of the two prescribed voltage states at their outputs in normal operation, dependent on the polarity of the input voltage, and assume one of the two prescribed signal states at their output in a defined manner given an open input, and in that the logic element outputs a free signal having a first logic state given identical logic levels at its input and outputs a busy signal having a second logic state to the control arrangement given unequal logic levels at its inputs. The data transmitters can thereby be connected to the subscriber stations in either unmediated or mediated fashion, particularly by way of transmission devices that are provided with modems. The interconnection of two data receivers of the recognition circuit can be realized outside of or inside of an integrated circuit.

Data transmitters for tristate application in standard interface modules respectively have a relatively low internal resistance between their output terminals and ground in the active condition and have a significantly higher internal resistance in their passive condition. As a source for a data receiver, the data bus therefore has source resistances that are defined by the state of the data transmitters connected thereto. In the unoccupied condition, the source resistances respectively correspond to the resistance of the high-impedance data transmitters connected in parallel. In the occupied or busy condition, the low-impedance output resistances of the data transmitter that seized the data bus are effective. This is true in the same manner for the case in which the data bus is terminated at at least one location via a resistor, particularly a resistor having the magnitude of the characteristic impedance of the data line.

An advantage that occurs on the basis of the aforementioned measures is that the subscriber stations can acquire information concerning the occupancy of the data bus with easily-recognizable devices without requiring a separate control bus for this purpose. A further advantage is that the recognition circuit is composed of commercially-available electronic circuits that meet the RS485 specification. With particular advantage, the busy signal can be used for the control of one or more modems such that the transmitter of the modem or, respectively, the transmitters of the modems, are driven into the active or passive condition dependent on the occupancy of the data bus. When a modem takes control of the data bus, then the data transmitters, or all other modems, are automatically activated without transfer devices comprising a requirement for involved control means.

An advantage therefore arises that the present invention can be utilized even under unfavorable conditions.

Particularly low expense occurs in that one of the two data receivers of the recognition circuits simultaneously serves as a data receiver of the appertaining subscriber station.

A subscriber station dare not access the data bus when it has already been occupied by another subscriber station. When a subscriber station has taken control of the data bus, the recognition circuit recognizes this condition. In this case, however, the data bus continues to be available to the subscriber station.

When the subscriber station itself does not contain a device that prevents a self-disconnection of the subscriber station in the operating state under consideration, then it is expedient to forward a busy signal to the subscriber station only when the data bus is occupied by a different subscriber station.

Since the data transmitters and the data receivers are activated with the assistance of control signals, the control signals make criteria available regarding whether an identified occupation of the data bus may possibly occur from the appertaining subscriber station itself. A common evaluation or logic operation of the control signal and of the busy criterion therefore allows a determination regarding whether the data bus is occupied by the appertaining subscriber station or by some other subscriber station. The circuit arrangement is thereby expediently constructed such that is is particularly characterized in that a control input of the subscriber station preceding the assigned data transmitter is respectively preceded by an AND gate that has a first input connected to the recognition circuit and that has its second input, together with the appertaining data transmitter, controllable by the subscriber stations such that the AND gate is enabled only given a passively-controlled data transmitter.

The AND gate inhibits the criterion "data bus occupied" when the appertaining subscriber station itself has occupied the data bus.

An arrangement that advantageously eliminates disturbances or, respectively, needle pulses arising due to switching events occurs from the circuit arrangement which, in addition, is particularly characterized in that the output of the logic element is fed to a Schmitt trigger via an RC circuit.

A further advantage occurs when the Schmitt trigger is constructed as an AND gate so that the Schmitt trigger simultaneously eliminates disturbances and realizes the desired AND operation.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 illustrates a circuit arrangement for serial data transmission. The two-lead bus 6 connects a plurality of assemblies of a remote control apparatus or of a remote control device, the digital assembly D and the transmission assembly U thereof being illustrated on the drawing. In addition to be used for data transmission, the two leads 61 and 62 of the data bus are also used for the communication of control signals that serve for a mutual control of the assemblies.

Figure 1:
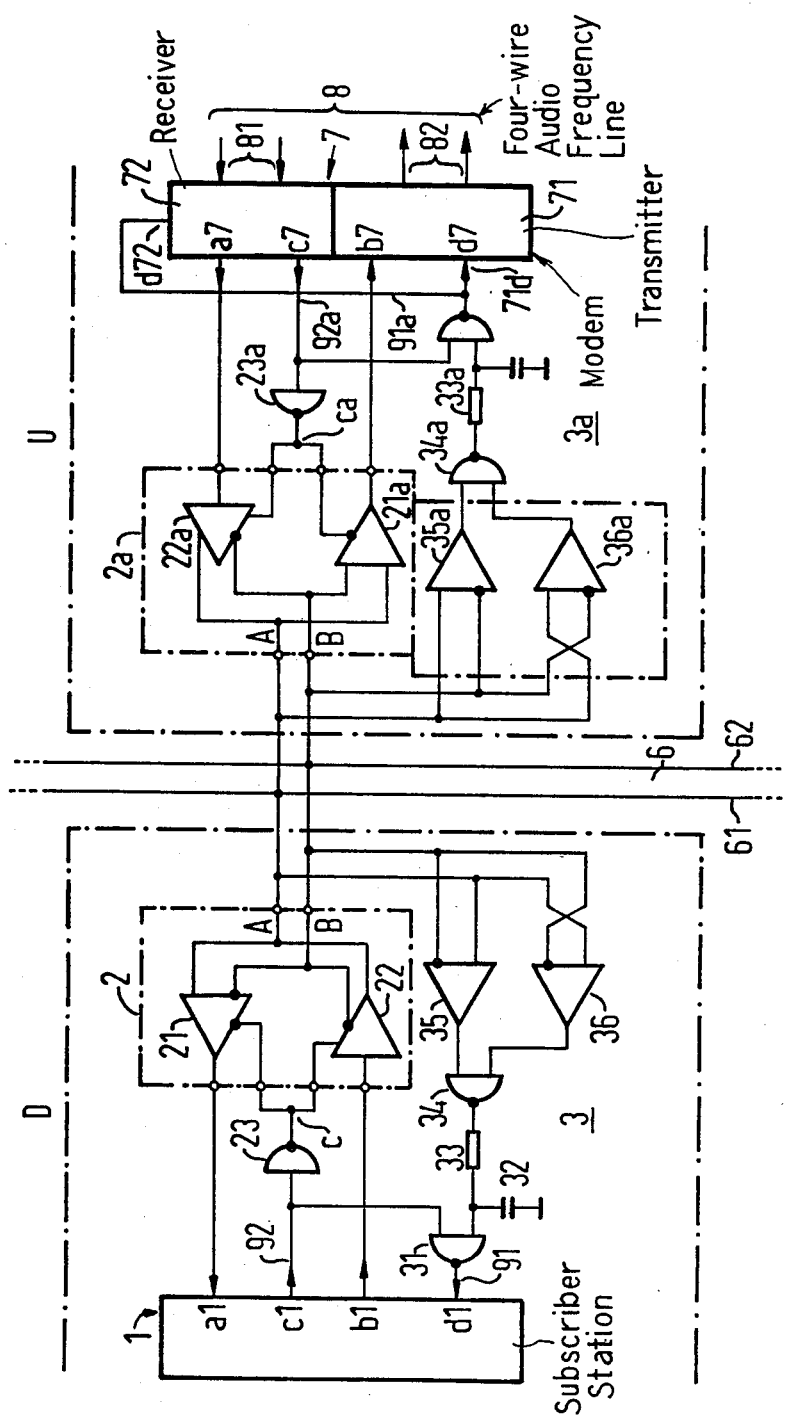
FIG. 1 is a schematic circuit diagram of a circuit arrangement for serial data transmission between a plurality of digital and transmission assemblies connected to one another via a data bus and which comprises recognition circuits which contain data receivers.

The digital assembly D is a device for executive sequencing and, as a subscriber station 1 contains a USART device 1 controlled by a microprocessor, an interface module 2 and a recognition circuit 3.

The transmission assembly U comprises a modem 7 connected to a four-wire audio frequency line 8 and which comprises a transmitter 71 and a receiver 72, and further comprises an interface module 2a and a recognition circuit 3a. The modem 7 comprises, for example, an FM transmitter and an FM receiver. The audio frequency line 8 leads to at least one further subscriber station and is a component of a remote control network comprising a plurality of stations or, respectively, further subscriber stations in the example set forth herein. The transmission line is a four-wire line composed of an incoming line 81 and an outgoing line 82. A two-wire line can be employed, when warranted, instead of the four-wire line. In this case, the transmitter 71 and the receiver 72 are to be connected to the two-wire line.

Further digital and/or transmission assemblies can be connected to the two leads 61 and 62 of the bus 6. In particular, such further digital assemblies can be devices for status signal input or output. Further transmission assemblies can serve the purpose of forwarding the serial data output onto the bus 6 by a digital assembly or by a transmission assembly to further transmission lines and stations connected thereto.

An interface suitable for such a multipoint bus configuration serves as an interface between the assemblies and the data bus 6, the data transmitters 22 or, respectively, 22a in such an assembly being high-impedance at the output in the unactivated condition. In particular, the interface RF485 is such an interface.

In a departure from FIG. 1, the data bus 6 can be terminated at both ends by a respective resistor between the two leads 61, 62 which has the characteristic impedance thereof. All subscriber stations lie at a common ground potential via a connection to ground that is not shown on the drawing.

For connection to the data bus 6, the assemblies, of which the drawing illustrates one digital assembly D and one transmission assembly U, are each provided with a respective interface module 2 or, respectively, 2a which, for example, can be of the type μA 96176.

In the interface module 2 of the digital assembly D, the output terminals A and B of the data transmitter 22 are directly connected to the input of the data receiver 21. The terminal A is connected to the lead 61 and the terminal B is connected to the lead 62 of the data bus 6.

The data transmitter 22 and the data receiver 21 each have their control terminals connected to a common control line C and can be alternately driven active and passive by control signals, so that only the data transmitter 22 or the data receiver 21 can be active at one time.

The interface module 2a of the transmission assembly U is constructed like the interface module 2 of the digital assembly D. The output of the data transmitter 22a is directly connected to the input of the data receiver 21a. The data transmitter 22a and the data receiver 21a each have their control terminals connected to the common control line Ca.

The interface module 2 of the digital assembly D is connected to the USART device 1. The interface module 2a of the transmission assembly U is connected to the modem 7.

The interface modules 2 and 2a represent level converters that are operated with the TTL level at that side facing away from the data bus 6. Depending on the logic states of the TTL logic level applied to the control line C, however, the data receiver 21 in the interface module 2 is activated and the data transmitter 22 is passive, or vice versa. In a corresponding manner, the data receiver 21a in the interface module 2a is activated and the data transmitter 22a is passive, or vice versa, depending on the logic level of the control signal applied to the control line Ca.

On the other hand it can be advantageous in the digital assembly D to control only the data transmitter 22 via the control line C and to always leave the data receiver 21 switched on. Therewith, the data signal transmitted onto the data bus by the digital assembly D can be simultaneously evaluated for supervision.

In the digital assembly D, the output of the data receiver 21 is connected to a data input a1 of the USART device 1. The input of the data transmitter 22 is connected to the data output b1 of the USART device 1. The control input of the data receiver 21 and the control input of the data transmitter 22 are directly connected to one another and to the control line C. A control output c1 of the USART device 1 is connected by way of an inverter 23 to the control line C of the interface module 2.

The recognition circuit 3 of the digital assembly D contains data receivers 35 and 36 whose inputs are connected to the leads 61 and 62 of the data bus 6 in antiparallel manner. The outputs of the data receivers 35 and 36 are connected to the inputs of a NAND gate 34. The output of the NAND gate 34 is connected to a signal input of a Schmitt trigger 31 via an RC element comprising a resistor 33 and a capacitor 32. A control input of the Schmitt trigger 31 is connected to the control output c1 of the USART device 1.

The two inputs of the Schmitt trigger 31 are linked to one another in the manner of an AND gate. The inverting output of the Schmitt trigger 31 is connected to the control input d1 of the USART device 1 via a control line 91.

The recognition circuit 3a of the transmission assembly U comprises a data receiver 35a and a data receiver 6a whose inputs are connected to the leads 61 and 62 of the data bus 6, again in an antiparallel manner. The outputs of the data receivers 35a and 36a are connected to the input of a NAND gate 34a. The output of the NAND gate 34a is connected to a signal input of a Schmitt trigger 31a via an RC element comprising a resistor 33a and a capacitor 32a. A control input of the Schmitt trigger 31a is connected to the control output c7 of the modem 7.

The two inputs of the Schmitt trigger 31a are linked to one another in the manner of an AND gate. The inverting output of the Schmitt trigger 31a is connected to the control inputs d71 and d72 of the modem 7 via a control line 91a.

An interface module of the type μA 96176 can be employed, for example, as the data transmitter 22 and the data receiver 21 or, respectively, the data transmitter 22a and the data receiver 21a. The data receivers of the recognition circuit can be, for example, of the type μA 96173 or 96175 manufactured by the Fairchild Company.

When the remote control station illustrated in FIG. 1 transmits, the transmission data are available at the output b1 of the USART device 1, are converted to the interface level in the data transmitter 22 of the interface module 22 serving as a driver, are fed via the lines 61 and 62 of the data bus 6 and the data receiver 21a of the interface module 2a, are converted to the TTL level by the latter and are output to the input b7 of the transmitter 71 contained in the modem 7.

In the receiving condition of the remote control station, the receiving data are available at the output a7 of the receiver 72 in the modem 7, are converted to the interface level in the data transmitter 22a of the interface module, are fed via the leads 61, 62 of the data bus 6 to the data receiver 21 of the interface module 2, are converted to the TTL level by the latter and are output to the data input a1 of the USART device 1.

The tristate condition of the RS485 data bus 6 corresponding to a logic level "0" on the control line C or, respectively, on the control line Ca, signals the connected assemblies that they can access the data bus. When an assembly access the data bus 6, the data bus assumes a nontristate condition. The evaluation of this condition leads to the formation of a control signal in the further assemblies which switches the control line 91 or, respectively, 91a to the logic level "0" and therefore inhibits the access of all other assemblies to the bus. This control signal also drives the transmission assembly (assemblies) such that the transmitter 71 become active toward the transmission line 8 and such that the receiver 72 is inhibited.

The USART device 1 can be, for example, of the type SAB 8251A.

The control of the interface module via the bus 6 comprises the following operating conditions.

(a) When the data bus 6 is not occupied, then all data transmitters 22, 22a are in a high-impedance tristate condition. In this condition, the data receivers 35 and 36 or, respectively, 35a and 36a that comprise what is referred to as a fail-safe method respectively output a high level or, respectively, a logic level "1" at the output to the two inputs of the complementary-metal-oxide-semiconductor (CMOS) NAND gates 34 or, respectively, 34a. The outputs of the NAND gates therefore have the logic level "0". The output of the Schmitt trigger 31 or, respectively, the Schmitt trigger 31a is therefore switched to the logic level "1", regardless of the logic level of the control signal connected to its control input.

In the digital assembly D and, under given conditions, in further digital assemblies, the logic level "1" on the control line 91 signals the USART device 1 that the data bus is not occupied. In this case, the audiofrequency transmission line 8 of the remote control network is also not occupied. In the transmission assembly and, under given conditions, in further transmission assemblies, the logic level "1" on the control line 91a drives the receiver 72 to the receiving mode and inhibits the transmitter 71.

(b) When the data bus 6 is seized by the digital assembly, then, in the seizing of the digital assembly, the control output c1 of the USART device 1 switches the control line 92 connected thereto to the logic level "0". The inverter 23 activates the data transmitter 22. The output of the date transmitter 22 is therefore in a low-impedance state. Dependent on the logic state at the data output b1 of the USART device 1, a logic level "1" or a logic level "0" is transmitted via the data bus 6.

The two prescribed voltages that the output terminals A, B of the data transmitters 22, 22a can assume relative to a reference potential have the same polarity.

In the case of the interface RS485, the voltage 3.7 V, for example, is at the output terminal A of the interface module 2 given the logic level "1" and the voltage 1.1 V, with respect to ground, is at the output terminal B. Given the logic level "0", the voltage 1.1 V, for example, is at the output terminal A and the voltage 3.7 V, for example, lies at the output terminal B. Given an activated interface module and a bus 6 thereby occupied, one of the two leads 61 or 62, therefore fundamentally lies at the low potential of, for example, 1.1 V and the other lead lies at the high potential of, for example, 3.7 V. The busy condition causes one of the two data receivers 35 and 36 to always output a logic level "1" at its output and the other to output a logic level "0". This, in turn, leads to the NAND gates 34 or, respectively, 34a assuming the logic level "1" in all assemblies.

In an active digital assembly D, this signal is not transmitted since the Schmitt trigger 31 is inhibited by a logic level "0" from the control output c1 of the USART device 1.

In the operating condition under consideration, further digital assemblies (not shown on the drawing) which may be present are not active, by contrast, so that the Schmitt triggers are opened by a logic level "1". A logic level "1" at the output of the NAND gate therefore drives the control line 91 to the logic level "0" via the following Schmitt trigger, informs the USART device that the data bus 6 is occupied by another assembly and therefore inhibit access to the data bus 6.

In the transmission assembly U and, under given conditions, in further transmission assemblies, the logic level "1" at the output of the NAND gate 34a drives the control line 91a to the logic level "0" via the following Schmitt trigger 31a, thus inhibits the receiver 72 and switches on the transmitter 71.

(c) When the data bus 6 is occupied by the transmission assembly U, then the receiver 72 receives a message from the remote control network via the audio frequency line 8. The control line 92a switches to the logic level "0", thus inhibits the Schmitt trigger 31a and activates the data transmitter 32a via the inverter 23a so that the data transmitter 22a works onto the data bus 6. The analogous case applies to a further transmission assembly in case the same occupies a data bus 6 instead of the transmission assembly U.

In the digital assembly D connected to the data bus 6, the NAND gate 34 recognizes the busy condition N, with a logic level "0" that proceeds to the control signal input d1 of the USART device 1 via the control line 91, inhibits the access of the USART device 1 to the bus 6. The same likewise applies to further digital assemblies connected to the bus 6.

When further transmission assemblies are connected to the data bus 6, then their NAND gates 34a recognize the busy condition and, via the following Schmitt trigger 31a, switch off the receiver 72 and switch on the data receiver 71.

Branching functions in the transmission network can be realized in a particularly simple manner with the assistance of the circuit arrangement without having additional logic operations or control signal lines required between the transmission assemblies.

In a modification of the illustrated circuit arrangement, it can also be expedient to not control the data receiver 21 or, respectively, 21a active or passive dependent on the occupancy of the data bus, but to always maintain it ready to receive in that its control input is permanently applied to ground potential.

Figure 2:
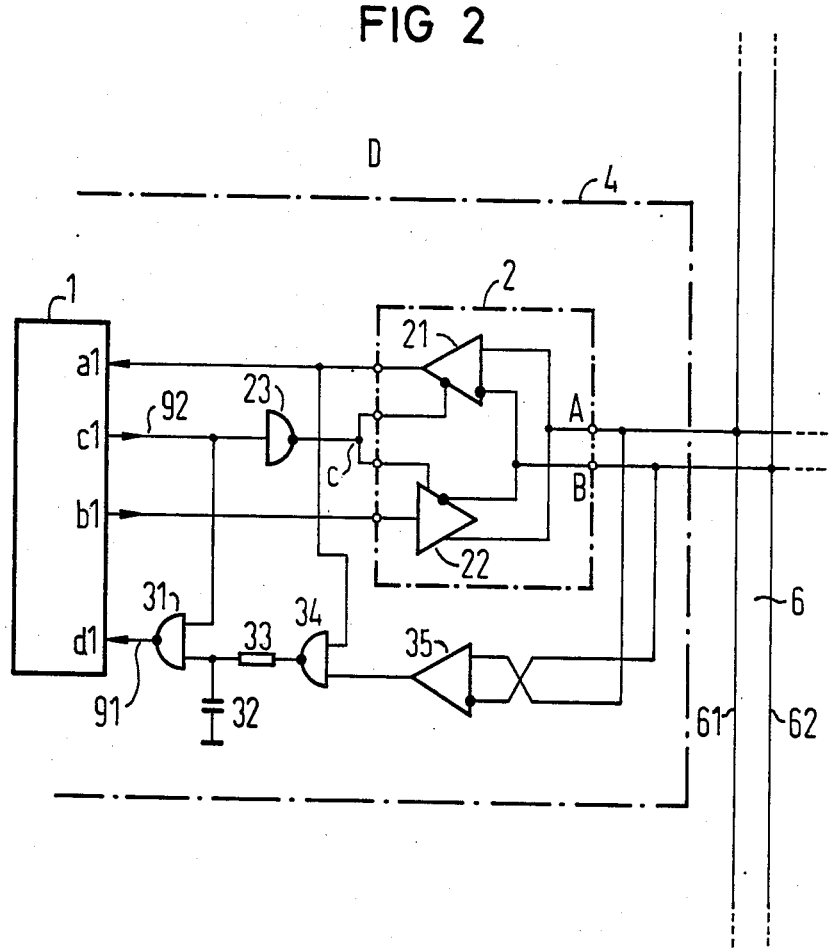
FIG. 2 is a schematic circuit diagram of a digital assembly of a circuit arrangement for serial data transmission, a data receiver in the digital assembly serving both as a signal receiver of the subscriber station and also belonging to the recognition circuit.

In the digital assembly illustrated in FIG. 2, which largely agrees with the digital assembly D of the circuit arrangement of FIG. 1, the data receiver 21 is a component of the recognition circuit so that the data receiver 36 of FIG. 1 may be eliminated. In the same manner, the data receiver 36a of FIG. 1 can also be eliminated. What is thereby essential is that the data receiver 21 also comprises a fail-safe circuit.

The data receivers 21 and 35 have their respective inputs connected to the data bus 6 in an antiparallel manner and have their outputs connected to the inputs of the NAND gate 34.

What is essential is that the two data receivers 21 and 35 are each always ready to receive. Departing from the circuit arrangement of FIG. 1, the data receiver 21 therefore does not have its control input connected to the inverter 23. In this case, the subscriber stations constantly receive data, i.e. they also listen in when other subscriber stations exchange data with one another.

In a corresponding manner, the data receivers serving for data transmission in further digital and/or transmission assemblies can also be a component portion of the recognition circuit at the same time.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for serial data transmission between two subscriber stations each connected to a respective transmission/receiving device, and each of said subscriber stations including means for transmitting data and means for receiving data, each means for transmitting data and each means for receiving data connected two leads of a data bus, each of said means for transmitting data normally assuming a passive condition and including a data input and a control input connected to the transmission/receiving device at the subscriber station containing the means for transmitting data, said control input responsive to control signals such that only one of the means for transmitting data is driven to an active condition at a time to output a voltage of a first polarity or of a second polarity dependent on the state of a data signal applied to its data input by the respective transmission/receiving device, each of the means for transmitting data having a higher internal impedance in the passive condition than in the active condition, and each of the means for receiving data operable in response to the data bus to output data to the respective transmission/receiving device, the improvement comprising:

first and second recognition circuits each in a respective one of said subscriber stations, each of said recognition circuits comprising first and second data receivers, including inputs connected in opposite polarity fashion to the two leads of the data bus and an output, said data receivers assuming one of two prescribed signal states at their outputs dependent on the polarity of their input voltage and assuming one of the two prescribed signal states at their outputs in a defined manner given a signal-free input; and logic means in each subscriber station including inputs connected to said outputs of the first and second data receivers in a subscriber station and an output connected to the transmitting/receiving device at the subscriber station containing said logic means, for producing at said output a free signal having a first logic state in response to identical logic levels at its input and producing a busy signal having a second logic state in response to unequal logic levels at its inputs.

2. The improved circuit arrangement of claim 1, wherein said means for receiving data in each of said subscriber stations comprises one of said first and second data receivers in the recognition circuit for the subscriber station.

3. The improved circuit arrangement of claim 1, and further comprising:

a Schmitt trigger in each subscriber station, each Schmitt trigger having a first input connected to the output of the logic means in the subscriber station and a second input connected to said control input of said means for transmitting data in the subscriber station, each Schmitt trigger being enabled only when the means for transmitting data connected to said second input is in said passive condition.

4. The circuit arrangement of claim 3, and further comprising:

a resistor-capacitor combination connected between said output of said logic means and said first input of said Schmitt trigger.

5. The improved circuit arrangement of claim 4, wherein:

said Schmitt trigger is constructed as an AND circuit.

6. The improved circuit arrangement of claim 5, wherein:

said logic means is a NAND gate.

* * * * *